(12) United States Patent
Yaeger et al.

(10) Patent No.: US 12,513,370 B1
(45) Date of Patent: Dec. 30, 2025

(54) SYSTEMS AND METHODS FOR BLENDING MEDIA

(71) Applicant: Apple Inc., Cupertino, CA (US)

(72) Inventors: Matthew J. Yaeger, Tustin, CA (US); Benjamin D. Buckner, Irvine, CA (US); Shalin M. Mehta, Fremont, CA (US)

(73) Assignee: Apple Inc., Cupertino, CA (US)

( * ) Notice: Subject to any disclaimer, the term of this patent is extended or adjusted under 35 U.S.C. 154(b) by 109 days.

(21) Appl. No.: 18/455,365

(22) Filed: Aug. 24, 2023

Related U.S. Application Data

(60) Provisional application No. 63/373,391, filed on Aug. 24, 2022.

(51) Int. Cl.
*H04N 21/84* (2011.01)

(52) U.S. Cl.
CPC ................. *H04N 21/84* (2013.01)

(58) Field of Classification Search
CPC ....... H04N 21/234327; H04N 21/2362; H04N 21/816; H04N 21/4345; H04N 19/597; H04N 13/161; H04N 21/4347
See application file for complete search history.

(56) References Cited

U.S. PATENT DOCUMENTS

| | | | |
|---|---|---|---|
| 2005/0259147 A1* | 11/2005 | Nam | H04N 21/2343 348/43 |
| 2018/0220119 A1* | 8/2018 | Horvitz | H04N 21/234363 |
| 2023/0343100 A1* | 10/2023 | Kadu | G06V 20/49 |

FOREIGN PATENT DOCUMENTS

EP  2200331 A2 * 6/2010 ............. H04H 20/40

* cited by examiner

*Primary Examiner* — Jason Salce
(74) *Attorney, Agent, or Firm* — Blank Rome LLP

(57) ABSTRACT

Streaming media includes generating an initialization segment having a first sample description for a first set of image parameters and a second sample description for a second set of image parameters. The method also includes transmitting a media stream including the initialization segment, a first set of frames referencing the first sample description, and a second set of frames referencing the second sample description.

20 Claims, 6 Drawing Sheets

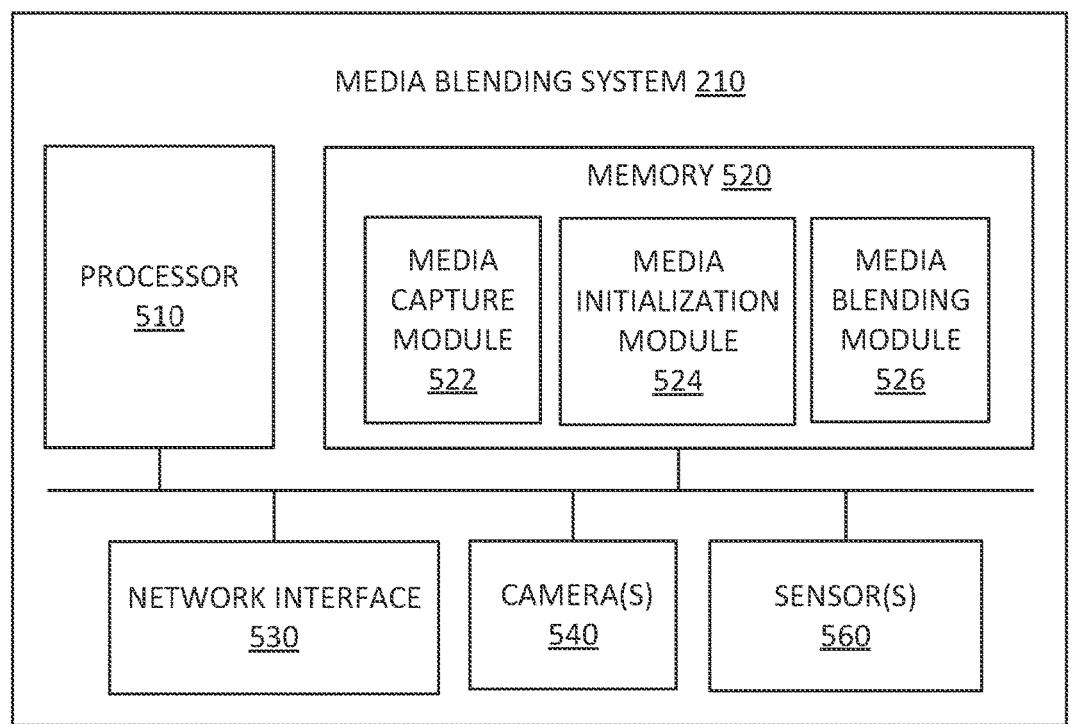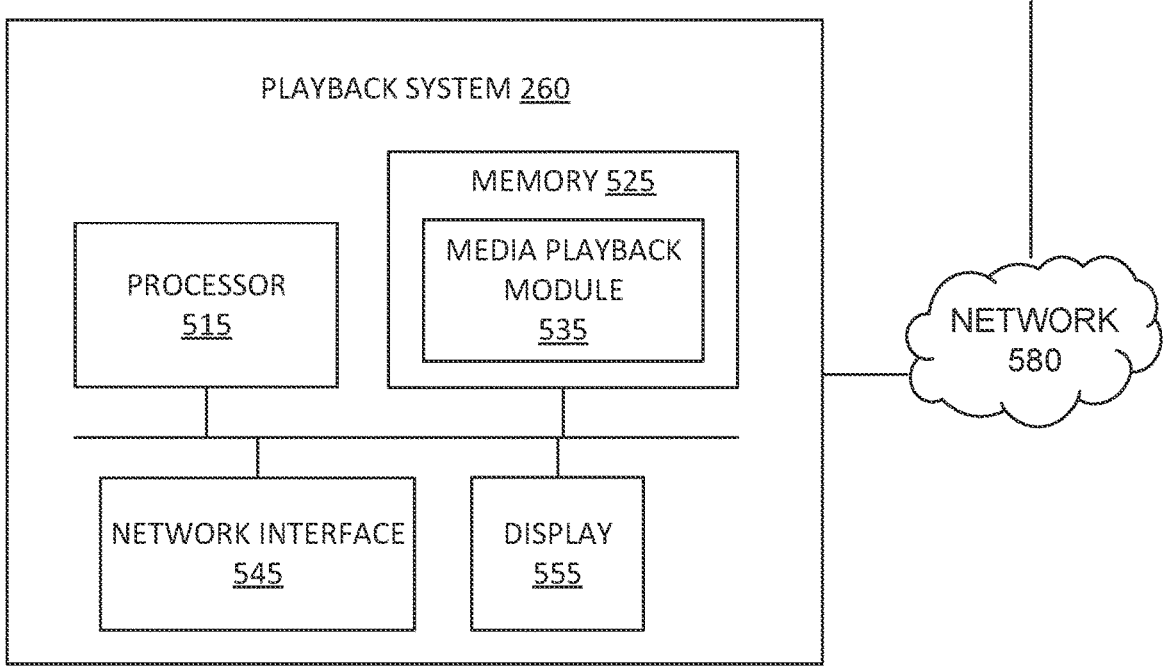
FIG. 5

SYSTEMS AND METHODS FOR BLENDING MEDIA

BACKGROUND

Two-dimensional (2D) media and three-dimensional (3D) media are usually streamed using a dedicated 2D media stream or 3D media stream, respectively. In applications that involve playback of 2D media and 3D media, 2D media streams and 3D media streams are transmitted to a playback device in individual media transmissions. As a result, 2D media streams and 3D media streams are not currently transmitted in combined media streams to playback devices. Similarly, 2D media streams and 3D media streams are not currently received by playback devices in combined media streams for rendering and are received in individual content streams that are rendered separately.

BRIEF DESCRIPTION OF THE DRAWINGS

FIG. 5 shows, in block diagram form, a simplified system diagram of a media blending and playback system in accordance with one or more embodiments.

DETAILED DESCRIPTION

Figure 1:
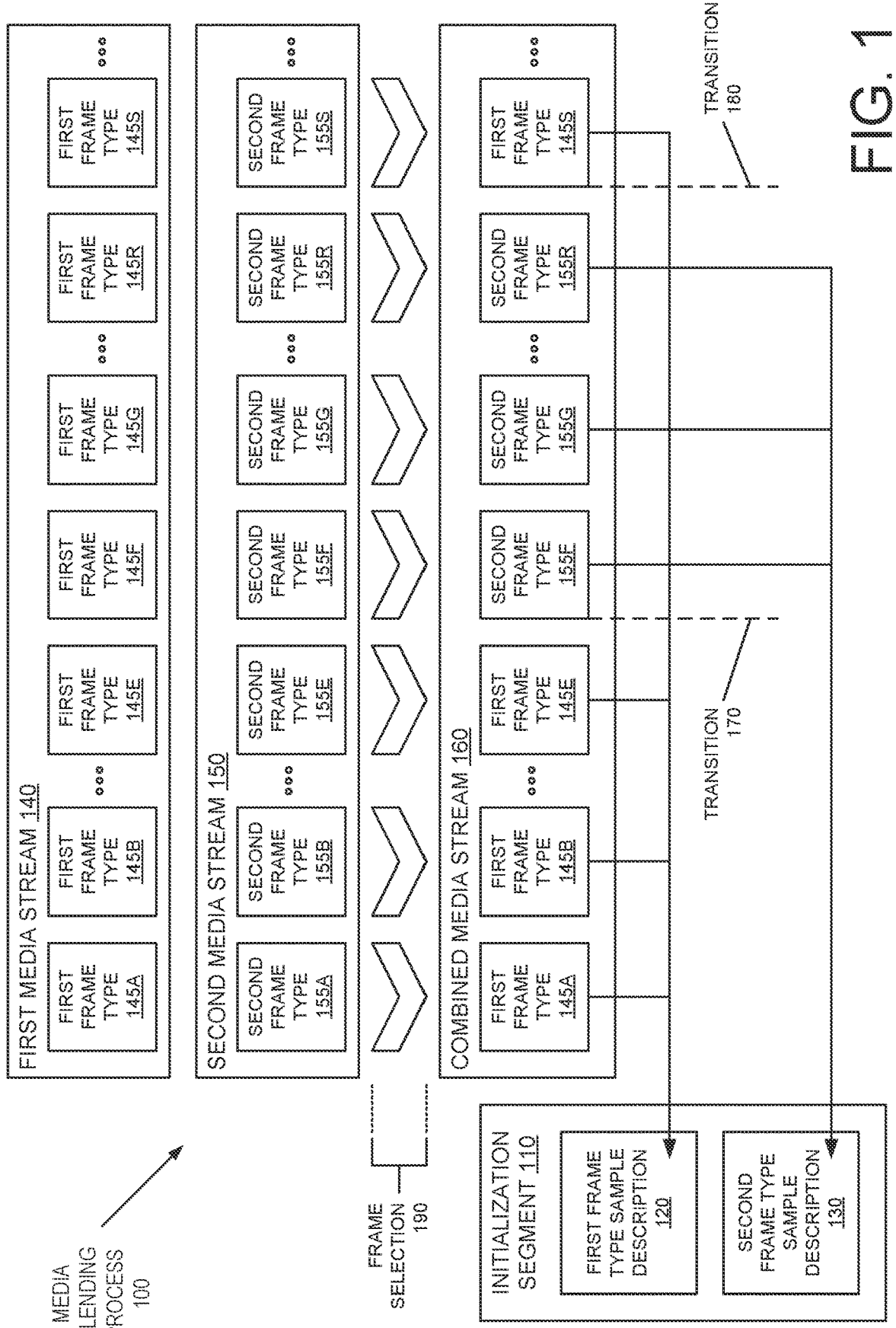
FIG. 1 shows example media streams of different types being interleaved for transmission in a combined media stream in accordance with one or more embodiments.

This disclosure is directed to systems, methods, and computer readable media configured to combine (e.g., blend) media content of at least two different types into a combined media stream. Specifically, content from a media stream of a first type and content from a media stream of a second type are provided together in a same combined media stream. As such, frames within the combined stream may be associated with different media stream types. In order for a receiving device to process the combined stream, an initialization segment is provided which includes sample descriptions for each source media stream from which frames are obtained for inclusion in the combined media stream. For example, in the combined media stream, frames including content of the first type and content from the second type are interleaved in the combined media stream transmission. The initialization segment may include rendering information for the media types. Frames in the combined media stream may reference a sample description such that a device receiving the combined media stream may determine, from the referenced sample description, how to render a particular frame.

In one or more embodiments, the term "media stream" refers to two or more frames arranged in a sequence overtime for transmission or reception. Further, the term "media streams of different types" refers to media streams configured to be rendered using different technologies (e.g., 2D content, 3D content, and the like), different resolutions (e.g., high resolution content or low resolution content), different frame rates (e.g., high frame rates or low frame rates), different codecs (e.g., H.264 or H.265), and/or different rendering techniques (e.g., foveated imaging). The combined media stream may include frames associated with two or more of the aforementioned different types of media content. For example, a combined media stream may include interleaving frames from 2D media streams and 3D media streams. In another example, frames corresponding to the 2D media streams may include a combination of high resolution frames and low resolution frames. Further, the same combined media stream may include interleaving groups of frames with high frame rates and low frame rates, according to some embodiments. The combined media stream may also combine multiple traits of the interleaved media streams. For example, the combined media stream may include frames from 2D media content with low resolution/framerate and H.264 encoding and at the same time include frames from 3D media content at high resolution/framerate and H.265 encoding. As such, the different classifications of frame types may be combined. Herein the terms "high" and "low" are relative values of resolution allocation and/or frame rate corresponding to individual frames. For example, a frame may be considered to include a low resolution as long as the frame includes a resolution allocation that is lower than the resolution allocations of a current resolution allocation being encoded or the resolution allocation of other frames in the same media stream. In some embodiments, "low resolution" or "low frame rate" may indicate a relative resolution or frame rate to other frames in the combined media stream, considered to be "high resolution" or "high frame rate" frames.

In the following description, for purposes of explanation, numerous specific details are set forth to provide a thorough understanding of the disclosed concepts. As part of this description, some of this disclosure's drawings represent structures and devices in block diagram form to avoid obscuring the novel aspects of the disclosed embodiments. In this context, it should be understood that references to numbered drawing elements without associated identifiers (e.g., 100) refer to all instances of the drawing element with identifiers (e.g., 100a and 100b). Further, as part of this description, some of this disclosure's drawings may be provided in the form of a flow diagram. The boxes in any particular flow diagram may be presented in a particular order. However, it should be understood that the particular flow of any flow diagram is used only to exemplify one embodiment. In other embodiments, any of the various components depicted in the flow diagram may be deleted, or the components may be performed in a different order, or even concurrently. In addition, other embodiments may include additional steps not depicted as part of the flow diagram. The language used in this disclosure has been principally selected for readability and instructional purposes and may not have been selected to delineate or circumscribe the disclosed subject matter. Reference in this disclosure to "one embodiment" or to "an embodiment" means that a particular feature, structure, or characteristic described in connection with the embodiment is included in at least one embodiment, and multiple references to "one embodiment" or to "an embodiment" should not be understood as necessarily all referring to the same embodiment or to different embodiments.

It should be appreciated that in the development of any actual implementation (as in any development project), numerous decisions must be made to achieve the developers' specific goals (e.g., compliance with system and business-related constraints), and that these goals will vary from one implementation to another. It will also be appreciated that such development efforts might be complex and time consuming but would nevertheless be a routine undertaking for those of ordinary skill in the art of image capture having the benefit of this disclosure.

For purposes of this disclosure, the term "camera system" refers to one or more lens assemblies along with the one or more sensor elements and other circuitry utilized to capture an image. For purposes of this disclosure, the "camera" may include more than one camera system, such as a stereo camera system, multi-camera system, or a camera system capable of sensing the depth of the captured scene.

A physical environment refers to a physical world that people may sense and/or interact with without aid of electronic systems. Physical environments, such as a physical park, include physical articles, such as physical trees, physical buildings, and physical people. People may directly sense and/or interact with the physical environment, such as through sight, touch, hearing, taste, and smell.

Referring to FIG. 1, an example diagram shows a media blending process 100 in accordance with one or more embodiments. The media blending process 100 includes identifying media streams of at least two different types, selecting a set of frames including frames of different types, combining these frames in a combined media stream and initializing frames of the combined media stream before providing the combined media stream for playback. In this example, a first media stream 140 is shown to include a set of frames of a first type (collectively 145). Further, a second media stream 150 is shown to include a set of frames of a second type (collectively 155). The first media stream 140 and second media stream 150 may be associated with different content types (e.g., 2D content or 3D content), resolution allocation (e.g., high to low resolution), frame rate (e.g., high to low frame rate), codec (e.g., H.264 and H.265) and/or intended rendering technique (e.g., foveated imaging). For purposes of explanation of the example of FIG. 1, the first media stream 140 and the second media stream 150 may include 2D content and 3D content, respectively.

In FIG. 1, once media streams of different types are identified, the media blending process 100 includes selecting a blended set of frames including frames of a first frame type 145 from the first media stream 140 and frames of a second frame type 155 from the second media stream 150 through a frame selection process 190.

In the example media blending process 100 of FIG. 1, the blended media set of frames includes frames of a first frame type 145A-145E and 145S, and frames of a second frame type 155F-155R. At any given point, the combined media stream 160 include frames of a single type. Frames of different frame types can be interleaved in the combined media stream 160. Thus, as shown, the combined media stream 160 begins with frames 145A-E of the first frame type, followed by frames of a second frame type 155F-R, and then returning to frames of the first frame type 145S. As the duration of a specific frame type ends, a transition occurs while the combined media stream 160 change from one frame type to another. In FIG. 1, the transitions between content streams are shown as a transition 170 and a transition 180. The transition 170 shows a change between media content from the first media stream 140 to the second media stream 150. The transition 180 shows a change between media content from the second media stream 150 to the first media stream 140.

In some embodiments, the media blending process 100 includes generating, for each frame type, a sample description, such as first frame type sample description 120, and second frame type sample description 130. These sample descriptions can be encoded into an initialization segment 110 for the combined media stream 160. The media blending process 100 may include assigning an index to each of the frames in accordance with their individual types, where the index identifies the appropriate sample description in the initialization segment 110.

Sample descriptions may include information indicating that the frame is part of one or more of the aforementioned different types of media content. As such, a receiving device, having the frame and the index, can determine how to render the frame based on the referenced sample description.

In some embodiments, the selection of a particular frame type may be performed based on a scene analysis of the scene captured by the media streams. For example, if the media blending system is configured to receive and combine media streams including objects moving at different speeds, the media blending system may be configured to perform a scene analysis that determines encoding frame rates based on the movement perceived in the captured frames. Similarly, if the media blending system is configured to receive and combine media streams as part of a foveated imaging procedure, the media blending system may be configured to perform a scene analysis that determines an encoding resolution based on a focal point or salient region perceived in the captured frames. The scene analysis in the context of the media blending process will be described in more detail in reference to FIG. 2.

Figure 2:
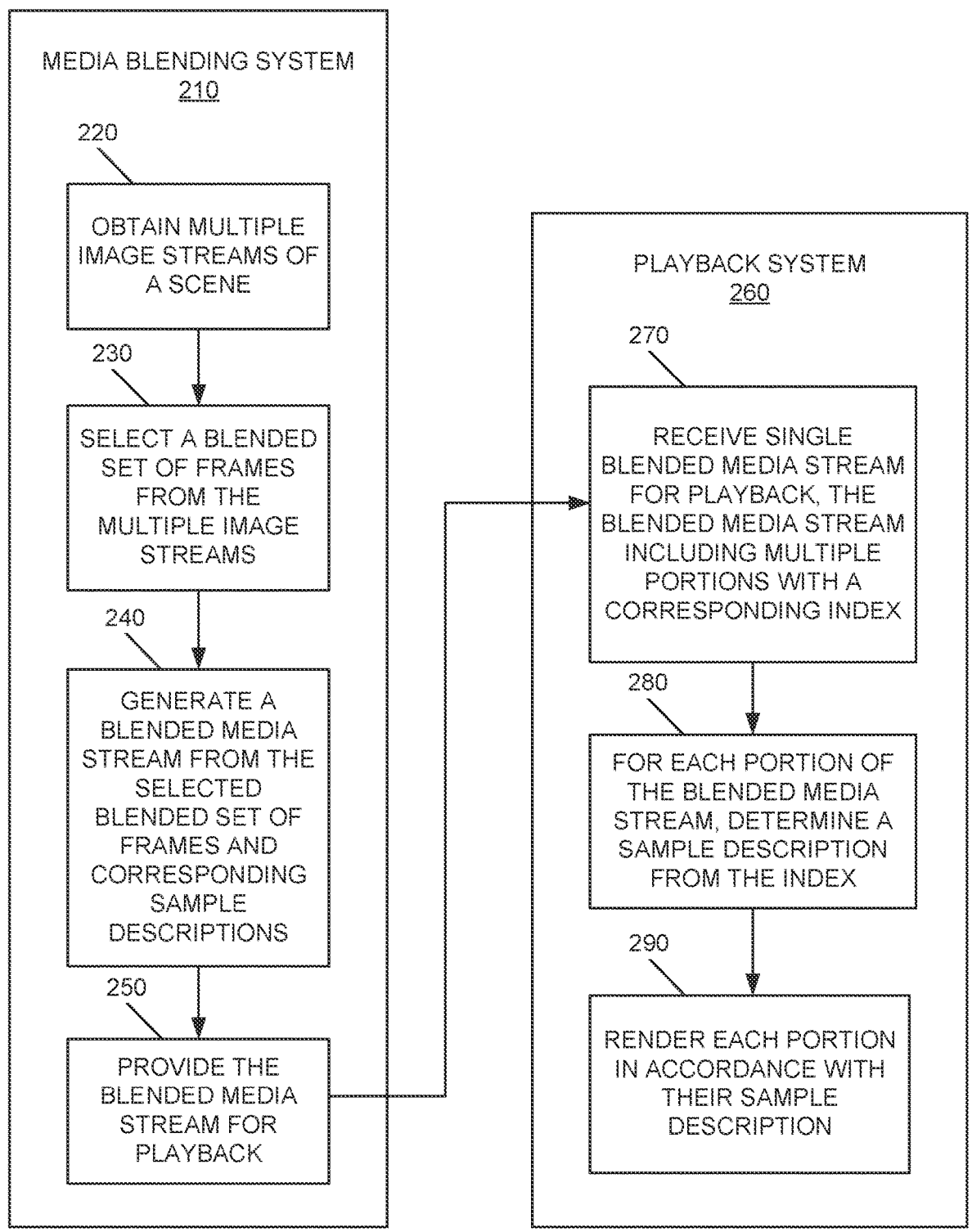
FIG. 2 shows, in flowchart form, an example technique for providing and rendering portions of a blended media stream in accordance with one or more embodiments.

FIG. 2 is a flow diagram of the media blending process 100 described in FIG. 1 being performed by a media blending system 210 in communication with a playback system 260. In particular, the flow diagram shows processes for capturing image streams from a scene of an environment, combining the media content from different types of media streams, and providing a combined media stream from the media blending system 210 to the playback system 260. The media blending system 210 may include an electronic device or system configured to execute a media blending process to obtain a blended media stream having frames of different types. The playback system 260 may be an electronic device or system that receives the blended media stream and render the frames in the blended media stream.

In the example of FIG. 2, the media blending system 210 obtains multiple image streams of a scene in block 220. The media blending system 210 may capture the image streams directly using one or more camera devices that are part of the media blending system 210, and/or from cameras systems that are communicably coupled to the media blending system 210. Additionally, or alternatively, the media blending system may obtain the image from storage, such as a local storage within the media blending system 210, or a remote source, such as network storage or from another storage device. The multiple media streams may be prelabeled in accordance with their respective types (e.g., 2D content, 3D content, focal point in a foveation setting, surrounding points in a foveation setting, and the like). In some embodiments, the media blending system 210 is provided information for selecting one or more frames from any two or more media streams.

At block 230, the media blending system 210 selects a blended set of frames from among the multiple image streams. As shown in FIG. 1, the media blending system 210 may combine frames from two or more individual content streams to generate a combined media stream. The blended set of frames may be a combination of frames from media streams of different types. As described above, the "different types" may refer to different sets of image parameters that define the content of a specific media stream. For example, a specific media stream may include image parameters indicating that this media stream includes immersive content (e.g., 3D content).

At block 240, the media blending system 210 generates a blended media stream from the selected blended set of frames. In some embodiments the media blending system generates an initialization segment for the combined media stream that includes sample descriptions for each of the different types of media streams. As described above, the sample descriptions are descriptors that define encoding and decoding associated with a specific media stream. The sample descriptions are referenced using indexes assigned to each frame. The sample descriptions may directly relate to the image parameters associated with each media stream.

In one or more embodiments, the set of image parameters indicate a particular type of media content in the media stream, such as 2D or 3D content. The image parameters may indicate that that the media stream includes linear media content to be decoded and rendered using 2D drives and/or a configuration for handling 2D content. The image parameters may indicate that that the media stream includes interactive or immersive media content to be decoded and rendered using interactive media drives and/or a configuration for handling interactive content. In some embodiments, the interactive content may be 2D content overlayed with on-screen prompt for action. The interactive content may be 3D content configured to immerse a viewer in the environment.

In one or more embodiments, the set of image parameters indicate a resolution allocation included in a media stream. The image parameters may indicate that the media stream includes media content including a specific resolution allocation. Further, the image parameters may indicate that that the media stream includes one or more specific resolution allocations. In some embodiments, the resolution allocations may be different between frames of the same media stream. Further, the resolution allocations may be different while remaining within a common resolution range. For example, three frames in a media stream may have different resolution allocations while remaining above a common resolution allocation threshold.

In one or more embodiments, the set of image parameters indicate a frame rate allocation included in a media stream. The image parameters may indicate that the media stream includes media content including a specific frame rate. Further, the image parameters may indicate that that the media stream includes one or more specific frame rates. In some embodiments, the frame rates may be different between frames of the same media stream. Further, the frame rates may be different while remaining within a common frame rate range. For example, three groups of frames in a media stream may have different frame rates while remaining above a common frame rate threshold.

In some embodiments, the frame rate may be adapted as a function of the resolution allocation in a given media stream. Similarly, the resolution allocation may be adapted as a function of the frame rate. The resolution allocation may be inversely proportional to the frame rate such that encoding frames at a high resolution allocation causes the media blending system 210 to adapt frame rate by lowering a frame rate value during encoding operations. In the example of FIG. 2, the media blending system 210 may perform a scene analysis from which a resolution allocation and a frame rate may be derived. For example, if the scene analysis identified slow moving objects in the frames of a media stream, the media blending system 210 may assign a high resolution allocation and a low frame rate to a group of frames showing the slow objects. The resolution allocation and the frame rate may be assigned based on a predetermined configuration that overrides the results of the scene analysis.

In one or more embodiments, the set of image parameters indicate a foveation setting included in a media stream. The image parameters may indicate that that the media stream includes a predetermined foveation setting based on one or more tracked parameters. The tracked parameters may include eye tracking data for a user of the playback system 260. Based on a user's gaze information, images may apply a predetermined foveation setting that encodes images at different levels of sharpness. In this example, foveation switching may be implemented in a single media stream in which different frames are encoded at different foveation settings/curves.

At block 250, the media blending system 210 provides the blended media stream for playback to the playback system 260. The media blending system 210 may transmit a single media stream to the playback system 260 that includes the initialization segment and the blended set of frames. The steps of blocks 220-250 may be implemented continuously as new information is obtained by the media blending system 210.

At block 270, the playback system 260 receives the single blended media stream for playback. The playback system 260 may identify that the single blended media stream includes multiple portions (e.g., one or more frames) of different media types. The playback system 260 may determine a specific type of a frame via the corresponding index in that frame. The playback device may identify the index of each portion and derive information referencing one or more decoding instructions from the initialization segment.

At block 280, the playback system 260 identifies a sample description based on the index for each frame of the blended media stream. The sample descriptions may indicate one or more techniques to be user for decoding and rendering the blended media stream based on a media type in the frame. For example, the playback system 260 may determine that sample descriptions for a first frame of the blended media stream includes 2D content and that sample descriptions for a second frame of the blended media stream includes 3D content.

Finally, at block 290, the playback system 260 renders each portion in accordance with their corresponding sample description. At this point, the playback system 260 renders the interleaving portions of the blended media stream based on their sample descriptions. Following the example mentioned in reference to block 280, the playback system 260 may determine a first rendering procedure for the 2D content and a second rendering procedure for the 3D content.

Figure 3:
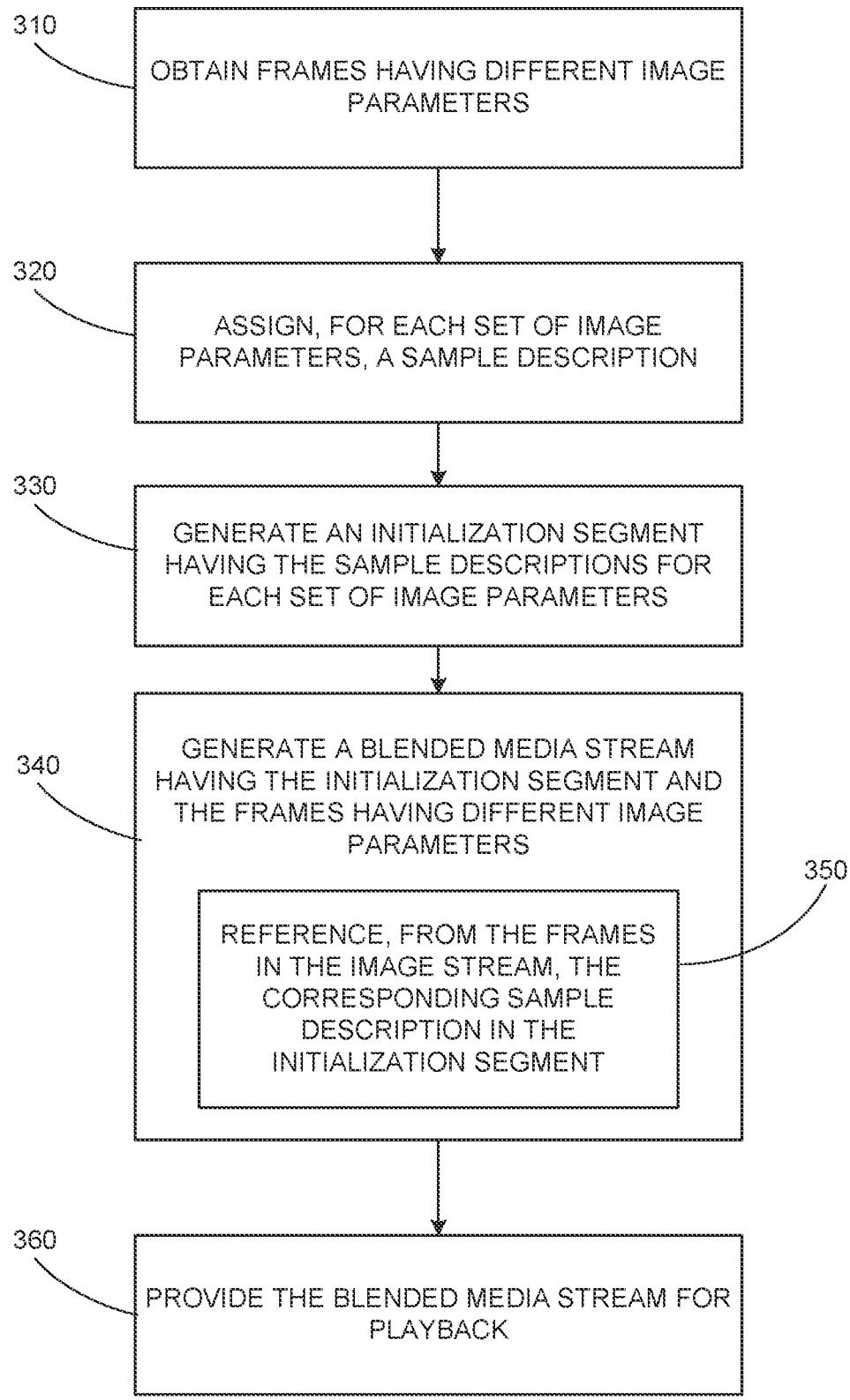
FIG. 3 shows, in flowchart form, a technique for providing a blended media stream for playback in accordance with one or more embodiments.

FIG. 3 shows a flowchart of a technique in which a blended media stream is provided for playback in accordance with one or more embodiments. The technique may be performed by the media blending system 210 described in reference to FIG. 2. Although the various processes depicted in FIG. 3 are illustrated in a particular order, it should be understood that these processes may be performed in a different order. Further, not all the processes may be necessary to perform. For purposes of explanation, the various processes will be described in the context of the particular components of particular devices; however, it should be understood that the various processes may be performed by additional or alternative components or devices.

The flowchart begins at block 310, where the media blending system 210 obtains frames having different image parameters. The media blending system 210 may capture or otherwise obtain frames from media streams of two or more types. As shown in FIGS. 1 and 2, the media blending system 210 may receive multiple media streams. The media blending system 210 may be preconfigured to obtain specific types of media content. For example, the media blending system 210 may be preconfigured to receive 2D content and 3D content.

The flowchart continues at block 320, where the media blending system 210 assigns a sample description to each frame based on image parameters for the frame. At this stage, the media blending system 210 may be configured to determine whether the frames include specific sets of image parameters based on a scene analysis of the multiple frames. As described above, scene analysis may be performed to determine a type of any media stream being obtained. For example, if the media blending system is configured to receive and combine media streams including objects moving at different speeds, the media blending system may be configured to perform a scene analysis that determines encoding resource allocations based on the movement perceived in the obtained frames. Similarly, if the media blending system is configured to receive and combine media streams as part of a foveated imaging procedure, the media blending system may be configured to perform a scene analysis that determines an encoding procedure based on a focal point or salient region perceived in the obtained frames The flowchart continues at block 330, where an initialization segment is generated having the sample descriptions for each set of image parameters. The media blending system 210 implements an initialization segment 110 for portions of the multiple media streams in the manner described in FIG. 1.

At block 340, the media blending system 210 generates a blended media stream having the initialization segment and the frames having different image parameters. As described above, the initialization segment includes indexes corresponding to multiple portions of the blended media stream. Each index identifies the type of the content associated with a portion of the blended media stream. Further, each index associates a type of image parameters with the portion of the blended media stream. In block 350, the media blending system 210 references, from the frames in the image stream, the corresponding sample description in the initialization segment. The step in this block will enable the playback system 260 to reference back a decoding and rendering process associated with the received indexes.

The flowchart concludes at block 360, the media blending system 210 provides the blended media stream for playback to the playback system 260. The blended media stream includes multiple portions indexed in accordance with the initialization segment. As described above, the playback device is configured to reference back encoding and rendering operations for the different portions based on the sample descriptions (e.g., image parameters) referenced by the indexes.

Figure 4:
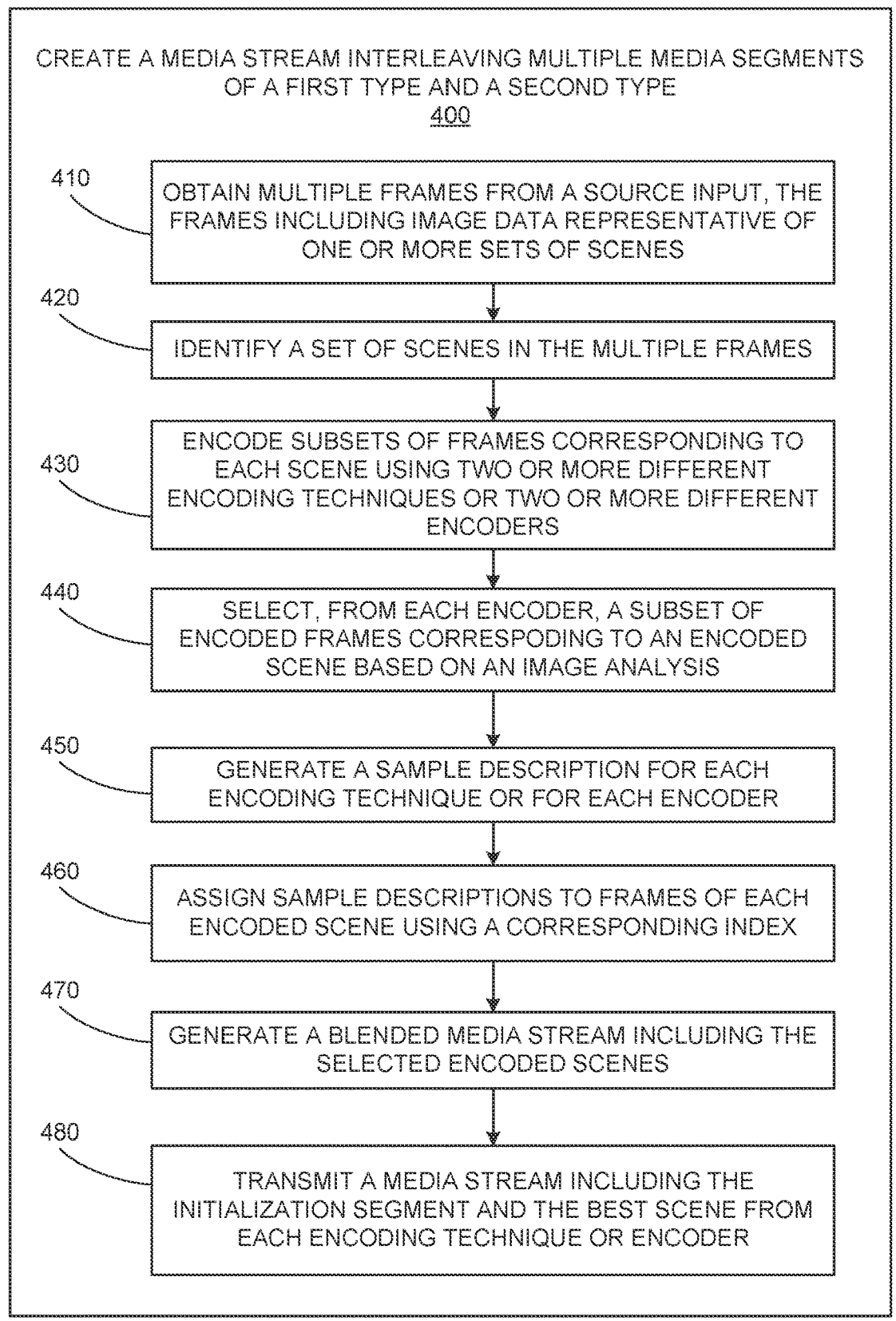
FIG. 4 shows, in flowchart form, a technique for creating a media stream by interleaving multiple media segments of different types in accordance with one or more embodiments.

FIG. 4 shows a flowchart of a technique in which media segments of different types are interleaved in a blended media stream in accordance with one or more embodiments. The technique may be performed by the media blending system 210 described in reference to FIG. 2. Although the various processes depicted in FIG. 4 are illustrated in a particular order, it should be understood that these processes may be performed in a different order. Further, not all the processes may be necessary to perform. For purposes of explanation, the various processes will be described in the context of the particular components of particular devices; however, it should be understood that the various processes may be performed by additional or alternative components or devices.

The flowchart begins at block 410, where the media blending system 210 obtains multiple frames from a source input. The frames may include image data representative of one or more sets of scenes. The media blending system 210 captures or otherwise obtains multiple frames from the source input. In some embodiments, the source input is a device used for capturing images in an environment. Additionally, or alternatively, the source input may be media repository (e.g., a memory or storage device) configured to provide the frames to a controller (e.g., processor) in the media blending system 210.

In block 420, the media blending system 210 identifies a set of scenes in the multiple frames. According to one or more embodiments, the scene may include one or more frames of the plurality of frames having similar image parameters. The image parameters may be identified as similar based on their image data. The image data may be evaluated by the media blending system 210 to identify similarities from one frame to another. A scene may include one or more frames.

At block 430, the media blending system 210 encodes subsets of frames corresponding to each scene using one or more different encoding techniques or two or more different encoders, thereby obtaining, for each scene, a plurality of encoded sets of frames. Based on the embodiment, the scenes may be encoded using a same technique, but at different resolution allocations, the scenes may be encoded using encoders using different techniques, and/or the scenes may be encoded using different encoders using the same or different techniques.

At block 440, the media blending system 210 selects, from each encoder, a subset of encoded frames corresponding to an encoded scene based on an image analysis. In some embodiments, where multiple encoding techniques and/or encoders are used to encode a same scene, the image analysis includes comparing different outputs from the different encoders, comparing the different outputs, and determining an output of the highest quality for each scene. The "highest quality" may correspond to a predetermined value definition associated with sharpness, focus and the like.

At block 450, the media blending system 210 generates a sample description for each encoding technique or encoder. The media blending system 210 may generates the sample descriptions in the manner described in block 350 of FIG. 3.

At block 460, the media blending system 210 assigns sample descriptions to frames of each encoded scene using a corresponding index. The media blending system 210 may relate sample descriptions to each scene via a corresponding index. In this example, the index may reference the encoder or the encoding technique used for encoding the selected scene.

At block 470, the media blending system 210 generates a blended media stream including the selected encoded scenes. The blended media stream includes the frames for each scene as encoded by their specific encoding technique and/or their specific encoder. Each scene includes an index referencing the sample descriptions corresponding to each encoding technique or encoder. The media blending system 210 may combine initialization segments that are uniquely indexed to have a specific position in time in a blended media stream. The positions in time may be assigned to specific scenes such that some scenes are interleaved before other scenes in the blended media stream. For example, the media blending system 210 may determine that, after two specific scenes of 2D content, the blended media stream transitions to 3D content. In this example, the initialization segment may be generated to account for a frame rate and a resolution allocation change in portions of the blended media stream after the two specific scenes.

The flowchart concludes at block 480, where the media blending system 210 transmits, for playback, a blended media stream with the initialization segment. The step on this block may be performed in the manner described in reference to block 360 in FIG. 3.

Referring to FIG. 5, a simplified block diagram of a media blending and playback system 500 is depicted, in accordance with one or more embodiments of the disclosure. The media blending and playback system 500 may include, and/or be part of, a multifunctional device, such as a mobile phone, tablet computer, personal digital assistant, portable music/video player, wearable device such as a head-mounted device, base station, laptop computer, desktop computer, network device, or any other electronic device. In some embodiments, the media blending and playback system 500 may include a media blending system 210 and a playback system 260 that communicate with one another using network interfaces 530 and 545 via a network 580.

According to one or more embodiments, the media blending system 210 is capable of providing motion detection from a sensor 560, such as an inertial measurement unit ("IMU") sensor, or other sensor that detects movement. The motion sensor 560 may detect a change in inertia that indicates a motion event. In this regard, motion parameters may be tracked using sensor data and thresholds associated with these motion parameters may indicate the motion event has occurred. The media blending system 210 may include a processor 510 (e.g., at least one processor). In some embodiments, the processor 510 may be separate from the media blending system 210 and may communicate with the media blending system 210 across the network 580, such as a wired connection, or a wireless short-range connection, among others. For example, in some embodiments, the processor 510 may be part of a smart accessory, such as a smart watch worn on a subject's wrist or arm, a smart headset device worn on the subject's head, a smart hearing device worn on the subject's ear, or any other electronic device that includes the sensor 560 from which at least some motion may be determined. The processor 510 may be a central processing unit (CPU) or a system-on-chip such as those found in mobile devices and include one or more dedicated graphics processing units (GPUs). Further, the processor 510 may include multiple processors of the same or different type.

The media blending system 210 may also include a memory 520 (e.g., a storage device). The memory 520 may include one or more different types of storage devices, which may be used for performing device functions in conjunction with the processor 510. For example, the memory 520 may include cache, ROM, RAM, or any kind of transitory or non-transitory computer readable storage medium capable of storing computer readable code. The memory 520 may store various programming modules for execution by the processor 510.

The media blending system 210 may include a media capture module 522, a media initialization module 524, and a media blending module 526 that are configured to perform one or more of the encoding functionalities described in reference to FIGS. 1-4. The media capture module 522 may perform the functionality described in reference to block 220 in FIG. 2. The media capture module 522 may be configured to obtain a multiple frames. The multiple frames include image data representative of different sets of image parameters. Further, the media capture module 522 may be configured to determine whether the multiple frames include the different types of image parameters based on a scene analysis of the multiple frames.

The media initialization module 524 may perform the functionality described in reference to block 230 in FIG. 2. The media initialization module 524 be configured to generate an initialization segment including sample descriptions of different types corresponding to different types of image parameters. The media blending module 526 may be configured to transmit a media stream including the initialization segment generated by the media initialization module 524 and different sets of frames referencing the different types of sample descriptions.

The media blending system 210 may include at least one camera 540 or other sensors, from which depth of a scene may be determined. In one or more embodiments, the camera 540 may be a traditional RGB camera, a depth camera, or other camera device by which image information may be captured. Further, the camera 540 may include a stereo or other multi-camera system, a time-of-flight camera system, or the like which capture images from which depth information of a scene may be determined.

According to one or more embodiments, the playback system 260 is configured to render one or more portions of the combined media stream received from the media blending system 210. The playback system 260 may act as a playback device that receives the combined media stream from the media blending system 210 and renders the individual portions of the combined media stream in accordance with their corresponding sample descriptions.

The playback system 260 may include a processor 515 (e.g., at least one processor). The processor 515 may perform one or more functionalities described in reference to the processor 510. The playback system 260 may also include a memory 525. The memory 525 may include one or more different types of storage devices, which may be used for performing device functions in conjunction with the processor 515. As described in reference to the memory 520, the memory 525 may store various programming modules for execution by the processor 515. In some embodiments, the memory 525 may include a media playback module 535 that is configured to perform one or more of the decoding functionalities described in reference to FIGS. 2-4.

The media playback module 535 may be executed to perform the functionality described in reference to blocks 270-290 described in FIG. 2. Specifically, the media playback module 535 may decode and render portions of a blended media streams after identifying their corresponding indexes. As described above, the media playback module 535 may be configured to perform one more rendering operations based on sample descriptions determined from the indexes. The playback system 260 may include a display 555 configured to show a visual representation of the rendered portions of the combined media stream.

Although the media blending system 210 is depicted as comprising the numerous components described above, in one or more embodiments, the various components may be distributed across multiple systems or devices. Particularly, in one or more embodiments, one or more of the media capture module 522, the media initialization module 524, and the media blending module 526 may be distributed differently across multiple devices. Thus, the media blending system 210 may not be needed to perform one or more techniques described herein, according to one or more embodiments. Accordingly, although certain calls and transmissions are described herein with respect to the particular systems as depicted, in one or more embodiments, the various calls and transmissions may be made differently directed based on the differently distributed functionality. Further, additional components may be used, some combination of the functionality of any of the components may be combined.

Figure 6:
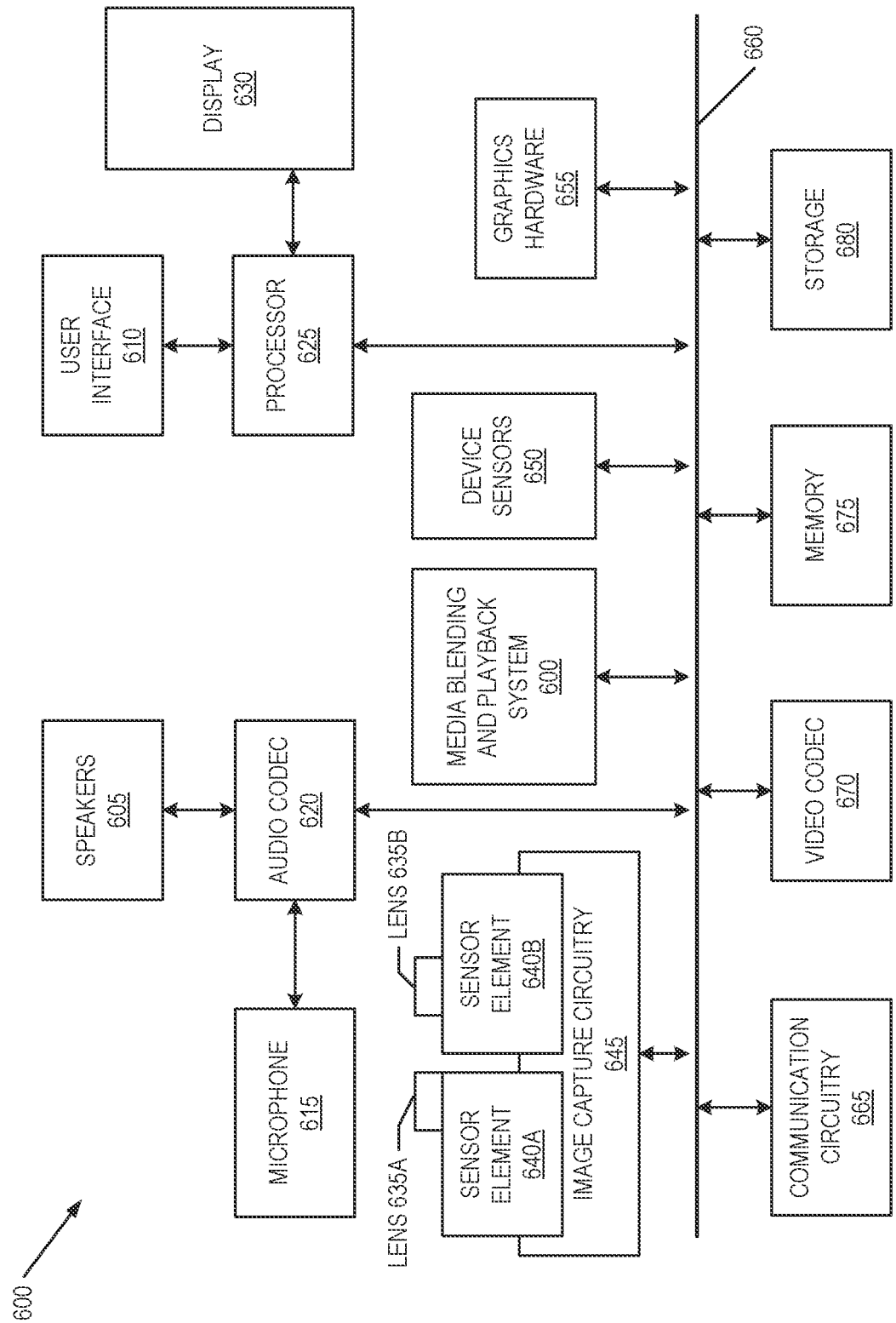
FIG. 6 shows, in block diagram form, a simplified system diagram of a multifunction electronic device in accordance with one or more embodiments.

Referring now to FIG. 6, a simplified functional block diagram of illustrative multifunction electronic device 600 is shown according to one or more embodiments. For example, the media blending and playback system 500 may include one or more multifunctional electronic devices or may have some or all the described components of a multifunctional electronic device described herein. Multifunction electronic device 600 may include a processor 625, a display 630, a user interface 610, device sensors 650, graphics hardware 655, an image capture circuitry 645, device sensors (e.g., proximity sensor/ambient light sensor, accelerometer and/or gyroscope), a microphone 615, audio codec(s) 620, speaker(s) 605, communications circuitry 665, the media blending and playback system 500 (e.g., including camera 540 or a camera system), video codec(s) 670 (e.g., in support of digital an image capture unit), a memory 675, a storage 680, and a communications bus 660. The multifunction electronic device 600 may be, for example, a digital camera or a personal electronic device such as a personal digital assistant (PDA), personal music player, mobile telephone, or a tablet computer.

The processor 625 may execute instructions necessary to carry out or control the operation of many functions performed by the multifunction electronic device 600 (e.g., such as the generation and/or processing of media content types as disclosed herein). The processor 625 may, for instance, drive the display 630 and receive user input from the user interface 610. The user interface 610 may allow a user to interact with multifunction electronic device 600. For example, the user interface 610 may take a variety of forms, such as a button, keypad, dial, a click wheel, keyboard, display screen and/or a touch screen. The processor 625 may also, for example, be a system-on-chip such as those found in mobile devices and include a dedicated graphics processing unit (GPU). The processor 625 may be based on reduced instruction-set computer (RISC) or complex instruction-set computer (CISC) architectures or any other suitable architecture and may include one or more processing cores. The graphics hardware 655 may be special purpose computational hardware for processing graphics and/or assisting the processor 625 to process graphics information. In one embodiment, the graphics hardware 655 may include a programmable GPU.

In one or more embodiments, the image capture circuitry 645 may include two (or more) lens assemblies (e.g., sensor elements 640A and 640B with corresponding lenses 635A and 635B), where each lens assembly may have a separate focal length. For example, one lens assembly may have a short focal length relative to the focal length of another lens assembly. Each lens assembly may have a separate associated sensor element. Alternatively, two or more lens assemblies may share a common sensor element. The image capture circuitry 645 may capture still and/or video images in collaboration with the collecting and rendering system 600. Output from the image capture circuitry 645 may be processed, at least in part, by video codec(s) 670 and/or the processor 625, and/or the graphics hardware 655. Images so captured may be stored in the memory 675 and/or the storage 680.

The memory 675 may include one or more different types of media used by the processor 625 and the graphics hardware 655 to perform device functions. For example, the memory 675 may include memory cache, read-only memory (ROM), and/or random access memory (RAM). The storage 680 may store media (e.g., audio, image, and video files), computer program instructions or software, preference information, device profile information, and any other suitable data. The storage 680 may include one more non-transitory computer-readable storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). The memory 675 and the storage 680 may be used to tangibly retain computer program instructions or code organized into one or more modules and written in any desired computer programming language. When executed by, for example, the processor 625 such computer program code may implement one or more of the methods described herein.

While FIGS. 1-6 show various configurations of components, other configurations may be used without departing from the scope of the disclosure. For example, various components in FIGS. 1-6 may be combined to create a single component. As another example, the functionality performed by a single component may be performed by two or more components.

The scope of the disclosed subject matter should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method for streaming media, comprising:
  generating an initialization segment comprising a first sample description for a first set of image parameters and a second sample description for a second set of image parameters;
  obtaining a plurality of frames, the plurality of frames including image data representative of the first set of image parameters or the second set of image parameters; and
  determining whether the plurality of frames include the first set of image parameters or the second set of image parameters based on a scene analysis of the plurality of frames;
  splitting the plurality of frames into a first scene comprising a first set of frames and a second scene comprising a second set of frames based on the determining;
  encoding the one or more scenes using one or more different encoding techniques;
  assigning the first sample description or the second sample description to each scene based on a corresponding encoding technique used; and
  transmitting a media stream comprising the initialization segment, the first set of frames referencing the first sample description, and the second set of frames referencing the second sample description.

2. The method of claim 1, wherein transmitting the media stream comprises interleaving the first set of frames and the second set of frames.

3. The method of claim 1, wherein the first sample description identifies the first set of frames as frames encoded using a first technique and wherein the second sample description identifies the second set of frames as frames encoded using a second technique.

4. The method of claim 1, wherein the first sample description identifies the first set of frames as 2D frames and wherein the second sample description identifies the second set of frames as 3D frames.

5. The method of claim 1, wherein the first set of image parameters comprises a first resolution and a first frame rate, and wherein the second set of image parameters comprises a second resolution and a second frame rate.

6. The method of claim 1, wherein the first set of image parameters comprises a first foveation setting, and wherein the second set of image parameters comprises a second foveation setting.

7. The method of claim 1, wherein the scene analysis of the plurality of frames determines a type of media stream in the plurality of frames.

8. The method of claim 1, wherein the scene analysis of the plurality of frames determines at least one of an encoding frame rate, an encoding resolution, and an encoding procedure.

9. A media blending system comprising:
a media capture module configured to:
obtain a plurality of frames, the plurality of frames including image data representative of a first set of image parameters or a second set of image parameters; and
determining whether the plurality of frames include the first set of image parameters or the second set of image parameters based on a scene analysis of the plurality of frames:
a media initialization module configured to:
generate an initialization segment comprising a first sample description for the first set of image parameters and the second sample description for a second set of image parameters,
split the plurality of frames into one or more scenes;
encode the one or more scenes using one or more different encoding techniques; and
assign the first sample description or the second sample description to each scene based on a corresponding encoding technique used; and
a media blending module configured to transmit a media stream comprising the initialization segment, a first set of frames referencing the first sample description, and a second set of frames referencing the second sample description.

10. The media blending system of claim 9, wherein the media blending module is further configured to interleave, during transmission of the media stream, the first set of frames and the second set of frames.

11. The media blending system of claim 9, wherein the scene analysis of the plurality of frames determines a type of media stream in the plurality of frames.

12. The media blending system of claim 9, wherein the scene analysis of the plurality of frames determines at least one of an encoding frame rate, an encoding resolution, and an encoding procedure.

13. A non-transitory computer readable medium comprising instructions that, when executed by at least one computer processor, cause the at least one computer processor to:
generate an initialization segment comprising a first sample description for a first set of image parameters and a second sample description for a second set of image parameters;
obtain a plurality of frames, the plurality of frames including image data representative of the first set of image parameters or the second set of image parameters; and
determine whether the plurality of frames include the first set of image parameters or the second set of image parameters based on a scene analysis of the plurality of frames;
split the plurality of frames into a first scene comprising a first set of frames and a second scene comprising a second set of frames based on the determining;
encode the one or more scenes using one or more different encoding techniques;
assign the first sample description or the second sample description to each scene based on a corresponding encoding technique used; and
transmit a media stream comprising the initialization segment, a first set of frames referencing the first sample description, and a second set of frames referencing the second sample description.

14. The non-transitory computer readable medium of claim 13, wherein the at least one computer processor is further caused to interleave, during transmission of the media stream, the first set of frames and the second set of frames.

15. The non-transitory computer readable medium of claim 13, wherein the first sample description identifies the first set of frames as frames encoded using a first technique and wherein the second sample description identifies the second set of frames as frames encoded using a second technique.

16. The non-transitory computer readable medium of claim 13, wherein the first sample description identifies the first set of frames as 2D frames and wherein the second sample description identifies the second set of frames as 3D frames.

17. The non-transitory computer readable medium of claim 13, wherein the first set of image parameters comprises a first resolution and a first frame rate, and wherein the second set of image parameters comprises a second resolution and a second frame rate.

18. The non-transitory computer readable medium of claim 13, wherein the first set of image parameters comprises a first foveation setting, and wherein the second set of image parameters comprises a second foveation setting.

19. The non-transitory computer readable medium of claim 13, wherein the scene analysis of the plurality of frames determines a type of media stream in the plurality of frames.

20. The non-transitory computer readable medium of claim 13, wherein the scene analysis of the plurality of frames determines at least one of an encoding frame rate, an encoding resolution, and an encoding procedure.

* * * * *